United States Patent
Bahadur et al.

(10) Patent No.: US 8,861,916 B2
(45) Date of Patent: Oct. 14, 2014

(54) EPOXY-FUNCTIONAL POLYSILOXANES, SILICONE COMPOSITION, AND COATED OPTICAL FIBER

(75) Inventors: Maneesh Bahadur, Midland, MI (US); Shedric O'Neal Glover, Midland, MI (US); Ann Walstrom Norris, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 636 days.

(21) Appl. No.: 12/957,486

(22) Filed: Dec. 1, 2010

(65) Prior Publication Data

US 2011/0070438 A1 Mar. 24, 2011

Related U.S. Application Data

(62) Division of application No. 11/884,612, filed as application No. PCT/US2006/006189 on Feb. 22, 2006, now abandoned.

(60) Provisional application No. 60/670,364, filed on Apr. 12, 2005.

(51) Int. Cl.
C08J 3/28 (2006.01)
C08G 77/04 (2006.01)
C03C 25/10 (2006.01)
C08L 83/06 (2006.01)
C08G 77/14 (2006.01)
C08G 77/38 (2006.01)

(52) U.S. Cl.
CPC ............ C03C 25/106 (2013.01); C08L 83/06 (2013.01); C08G 77/14 (2013.01); C08G 77/38 (2013.01)
USPC ........... 385/128; 427/513; 428/391; 522/162; 528/27

(58) Field of Classification Search
CPC ......... C08L 63/00; C08L 83/00; C08L 83/04; H01L 23/296; C09D 183/04; C09D 183/06; C08G 77/04; C08G 59/4215; C08G 77/14; C08G 59/3254; C08G 18/61; C08G 59/3281; C08G 77/70
USPC ........... 385/128; 427/513; 428/391; 522/162; 528/27
See application file for complete search history.

(56) References Cited

U.S. PATENT DOCUMENTS

| | | | |
|---|---|---|---|
| 3,419,593 A | 12/1968 | Willing et al. | |
| 4,987,203 A * | 1/1991 | Saho et al. ...................... | 528/27 |
| 5,057,358 A | 10/1991 | Riding et al. | |
| 5,158,991 A | 10/1992 | Riding | |
| 5,187,251 A | 2/1993 | Jachmann et al. | |
| 5,310,601 A | 5/1994 | Riding | |
| 5,332,797 A | 7/1994 | Kessel et al. | |
| 5,516,858 A * | 5/1996 | Morita et al. ................. | 525/478 |
| 5,693,688 A | 12/1997 | Priou | |
| 6,240,224 B1 | 5/2001 | Reekie et al. | |
| 6,326,416 B1 | 12/2001 | Chien et al. | |
| 7,534,820 B2 | 5/2009 | Kohno et al. | |
| 2003/0152352 A1 | 8/2003 | Starodubov | |
| 2004/0228594 A1 | 11/2004 | Andre et al. | |
| 2007/0189687 A1 | 8/2007 | Walker, Jr. et al. | |

FOREIGN PATENT DOCUMENTS

EP  0 473 995 A2  11/1992

OTHER PUBLICATIONS

L. Chao, L. Reekie, M. Ibsen, E., "Grating writing through fibre coating at 244 and 248nm," Electronics Letters, May 27, 1999, vol. 35, No. 11, pp. 924-926.

* cited by examiner

*Primary Examiner* — Ling Choi
*Assistant Examiner* — Chun-Cheng Wang
(74) *Attorney, Agent, or Firm* — Claude F. Purchase; James L. Cordek

(57) ABSTRACT

Epoxy-functional polysiloxanes containing epoxy groups and hydrocarbyl groups free of aliphatic unsaturation, a silicone composition containing a polysiloxane selected from the aforementioned epoxy-functional polysiloxanes, a cured polysiloxane prepared by exposing the silicone composition to ultraviolet radiation, a coated optical fiber containing a cured polysiloxane, and a method of preparing a coated optical fiber.

6 Claims, No Drawings

EPOXY-FUNCTIONAL POLYSILOXANES, SILICONE COMPOSITION, AND COATED OPTICAL FIBER

CROSS-REFERENCE TO RELATED APPLICATIONS

This application is a divisional of U.S. patent application Ser. No. 11/884,612, filed on 16 Aug. 2007 now abandoned, which is a U.S. national stage filing under 35 U.S.C. §371 of PCT Application No. PCT/US06/006189 filed on 22 Feb. 2006, which claims the benefit of U.S. Provisional Patent Application No. 60/670,364 filed 12 Apr. 2005 under 35 U.S.C. §119 (e). PCT Application No. PCT/US06/006189 and U.S. Provisional Patent Application No. 60/670,364 are hereby incorporated by reference.

FIELD OF THE INVENTION

The present invention relates to epoxy-functional polysiloxanes and more particularly to epoxy-functional polysiloxanes containing epoxy groups and hydrocarbyl groups free of aliphatic unsaturation. The present invention also relates to a silicone composition containing a polysiloxane selected from the aforementioned epoxy-functional polysiloxanes, a cured polysiloxane prepared by exposing the silicone composition to ultraviolet radiation, a coated optical fiber containing a cured polysiloxane, and a method of preparing a coated optical fiber.

BACKGROUND OF THE INVENTION

Coated optical fibers typically have at least three components: a core, a cladding surrounding the core, and a protective coating on the cladding. Both the core and the cladding are typically made of silica glass, but the core typically has germanium doping to increase its refractive index and, thus, minimize loss of light from the core.

Coated optical fibers can also contain at least one Bragg grating, a segment of the fiber core having a periodic modulation in refractive index. Optical fibers containing Bragg gratings (fiber Bragg gratings) have proven useful in a wide variety of applications, including telecommunications, sensors, and sensor arrays. For example, fiber Bragg gratings are widely used in telecommunication components and devices, such as wavelength stabilizers for pump lasers, narrowband add/drop filters for wavelength division multiplexing, and gain-flattening filters. Fiber Bragg gratings are also widely used in fiber optic sensors, particularly sensors for strain, pressure, and temperature measurements.

Fiber Bragg gratings are typically fabricated by exposing an optical fiber core to an ultraviolet laser beam to produce periodic changes in the refractive index of the core in the exposed region. However, because most protective coatings are not transparent to ultraviolet light at the wavelengths (e.g., 193 nm and 240 nm) commonly used to write gratings, the coating must be removed before exposing the core to ultraviolet light. The optical fiber must then be recoated to prevent damage to the fiber and to preserve its mechanical strength. These stripping and coating operations are problematic, time-consuming, and expensive. For example, once stripped of the protective coating the fiber is susceptible to irreversible environmental degradation caused by humidity and debris. Also, the material used to recoat the fiber must have good adhesion to the silica surface of the cladding.

Various approaches to solving the problems associated with stripping and recoating optical fibers have been reported.

For example, Patent Application Publication No. 2003/0152352 A1 to Starodubov discloses a refractive index grating fabricated in an optical fiber having a multilayer coating and a method for making refractive index patterns such as gratings in optical fibers such that the mechanical properties of the original fiber are preserved. The patterns are written into the optical fiber by partially stripping away the outer coating of the fiber, exposing the core of the fiber through the remainder of the coating with an actinic radiation to form the pattern in the photosensitive core of the fiber, followed by recoating the fiber in the stripped area to provide protection of the newly formed pattern from corruption and to preserve the mechanical properties of the fiber.

U.S. Patent Application Publication No. US 2004/0228594 A1 to Andre et al. discloses an optical fiber having at least one Bragg grating, the fiber comprising a core surrounded successively by cladding and by a coating, said rating being obtained by being written directly in the core and/or the cladding of the fiber through the coating which is made of a material that is substantially transparent to ultraviolet type radiation used for writing said grating, wherein the material of said coating contains a first polymer network interpenetrated by a second polymer.

U.S. Pat. No. 6,240,224 B1 to Reekie et al. discloses a coated optical fiber comprising a coating, an optical fiber, at least one waveguiding region and an index grating. The waveguiding region contains at lest one photosensitive region, the index grating is formed by writing through the coating using UV light, and the coating transmits UV light at the wavelength at which the index grating is written. The '224 patent also teaches the coating should not contain a photoinitiator, since photo-initiators are often UV sensitive.

Chao et al. (Electronics Letters, 27 May 1999, Vol. 35 (11), 924-926) disclose fiber Bragg gratings fabricated by writing through the fiber coating using both 244 nm frequency-doubled Ar$^+$-ion and 248 nm KrF excimer lasers.

Although, the aforementioned references disclose various methods of fabricating fiber Bragg gratings, there is a continued need for a fast, low cost method of fabricating gratings that is suitable for large scale manufacture.

SUMMARY OF THE INVENTION

The present invention is directed to an epoxy-functional polysiloxane having the formula:

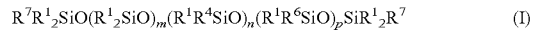

$$R^7R^1_2SiO(R^1_2SiO)_m(R^1R^4SiO)_n(R^1R^6SiO)_pSiR^1_2R^7 \quad (I)$$

wherein $R^1$ is $C_1$ to $C_3$ alkyl or phenyl; $R^4$ is —$CH_2$—$CHR^2R^3$, wherein $R^2$ is $C_2$ to $C_{10}$ hydrocarbyl free of aliphatic unsaturation and $R^3$ is $R^1$ or H; $R^6$ is —$CH_2$—$CHR^3R^5$, wherein $R^5$ is an epoxy group; $R^7$ is $R^1$, $R^4$, or $R^6$; m is from 0.1 to 0.9; n is from 0.1 to 0.5; p is from 0.1 to 0.6; and m+n+p=1.

The present invention is also directed to an epoxy-functional polysiloxane having the formula:

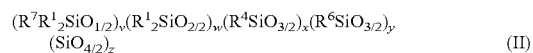

$$(R^7R^1_2SiO_{1/2})_v(R^1_2SiO_{2/2})_w(R^4SiO_{3/2})_x(R^6SiO_{3/2})_y(SiO_{4/2})_z \quad (II)$$

wherein $R^1$ is $C_1$ to $C_3$ alkyl or phenyl; $R^4$ is —$CH_2$—$CHR^2R^3$, wherein $R^2$ is $C_2$ to $C_{10}$ hydrocarbyl free of aliphatic unsaturation and $R^3$ is $R^1$ or H; $R^6$ is —$CH_2$—$CHR^3R^5$, wherein $R^5$ is an epoxy group; $R^7$ is $R^1$, $R^4$, or $R^6$; v is from 0 to 0.5; w is from 0.1 to 0.9; x is from 0.1 to 0.7; y is from 0.1 to 0.5; z is from 0 to 0.5; and v+w+x+y+z=1.

The present invention is also directed to a silicone composition, comprising a polysiloxane selected from the aforementioned epoxy-functional polysiloxanes, and a cationic photoinitiator.

The present invention is also directed to a cured polysiloxane prepared by exposing the aforementioned silicone composition to ultraviolet radiation.

The present invention is further directed to a coated optical fiber, comprising:

an optical fiber comprising a glass fiber core and a cladding surrounding the core, wherein the cladding has a refractive index less than the refractive index of the core; and a silicone coating surrounding the optical fiber, wherein the coating comprises a cured polysiloxane prepared by applying the silicone composition of the present invention on the optical fiber to form a film and exposing the film to ultraviolet radiation.

The present invention is still further directed to a method of preparing a coated optical fiber comprising applying the silicone composition of the instant invention on an optical fiber to form a film, wherein the optical fiber comprises a glass fiber core and a cladding surrounding the core and the cladding has a refractive index less than the refractive index of the core; and exposing the film to ultraviolet radiation to form a silicone coating.

The epoxy-functional polysiloxanes of the present invention have very low absorbance in the ultraviolet region of the electromagnetic spectrum and good shelf-stability. Moreover, the polysiloxanes contain highly reactive epoxy groups and can be cured rapidly to produce durable cross-linked polysiloxanes.

The silicone composition of the present invention can be conveniently formulated as a one-part composition having good shelf-stability in the absence of ultraviolet light. Moreover, the composition can be applied to a substrate by conventional high-speed methods such as spin coating, in-line optical fiber coating, printing, and spraying. Furthermore, the silicone composition cures rapidly upon exposure to ultraviolet light.

The cured polysiloxane prepared by exposing the silicone composition to ultraviolet radiation exhibits high transparency, typically at least 70% transmittance, alternatively at least 80% transmittance, alternatively at least 85%, at a wavelength of 248 nm for a free-standing film (i.e., without a substrate) having a thickness of 60 µm. Moreover, the cured polysiloxane has good primerless adhesion to a variety of substrates. The cured polysiloxane also exhibits excellent durability, chemical resistance, and flexibility at low temperatures.

The coated optical fiber of the present invention exhibits good resistance to abrasion, organic solvents, water vapor, and oxygen. Moreover, the coated optical fiber has good thermal stability and mechanical strength.

The method of preparing the coated optical fiber of the present invention is scaleable to a high throughput manufacturing process. Also, the method employs conventional optical fiber fabrication techniques (e.g., coating and curing) and equipment. Importantly, the method can further comprise writing at least one Bragg grating on the core of the fiber directly through the silicone coating, thereby eliminating conventional stripping and recoating operations and the problems associated therewith.

The coated optical fiber of the present invention is useful in a wide variety of applications, including telecommunications, sensors, and sensor arrays. In particular, the coated optical fiber containing at least one Bragg grating is useful in telecommunication components and devices, such as narrowband and broadband tunable filters, optical fiber mode converters, spectrum analyzers, narrowband lasers, wavelength stabilizers for pump lasers, add/drop filters for wavelength division multiplexing, and gain-flattening filters; and in fiber optic sensors, particularly sensors for strain, pressure, and temperature measurements.

DETAILED DESCRIPTION OF THE INVENTION

As used herein, the term "hydrocarbyl free of aliphatic unsaturation" means the hydrocarbyl group does not contain an aliphatic carbon-carbon double bond or carbon-carbon triple bond. Also, the term "epoxy group" refers to a monovalent organic group in which an oxygen atom is directly attached to two adjacent carbon atoms of a carbon chain or ring system.

A first epoxy-functional polysiloxane according to the present invention has the formula:

$$R^7R^1{}_2SiO(R^1{}_2SiO)_m(R^1R^4SiO)_n(R^1R^6SiO)_pSiR^1{}_2R^7 \qquad (I)$$

wherein $R^1$ is $C_1$ to $C_3$ alkyl or phenyl; $R^4$ is —$CH_2$—$CHR^2R^3$, wherein $R^2$ is $C_2$ to $C_{10}$ hydrocarbyl free of aliphatic unsaturation and $R^3$ is $R^1$ or H; $R^6$ is —$CH_2$—$CHR^3R^5$, wherein $R^5$ is an epoxy group; $R^7$ is $R^1$, $R^4$, or $R^6$; m is from 0.1 to 0.9; n is from 0.1 to 0.5; p is from 0.1 to 0.6; and m+n+p=1.

The first epoxy-functional polysiloxane is a copolymer containing repeat units having the formulas $R^1{}_2SiO_{2/2}$, $R^1R^4SiO_{2/2}$, and $R^1R^6SiO_{2/2}$, and endgroups having the formula $R^7R^1{}_2SiO_{1/2}$. The repeat units can be arranged in any order. For example, the repeat units can be arranged in random, alternating, block, or statistical order. Moreover, the epoxy groups can be located at terminal, pendant, or both terminal and pendant positions.

The alkyl groups represented by $R^1$ typically have from 1 to 3 carbon atoms and are exemplified by methyl, ethyl, propyl, and 1-methylethyl.

The hydrocarbyl groups represented by $R^2$ are free of aliphatic unsaturation and typically have from 2 to 10 carbon atoms, alternatively from 2 to 6 carbon atoms. Acyclic hydrocarbyl groups containing at least 3 carbon atoms can have a branched or unbranched structure. Examples of hydrocarbyl groups represented by $R^2$ include, but are not limited to, alkyl, such as ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, octyl, nonyl, and decyl; cycloalkyl, such as cyclopentyl, cyclohexyl, and methylcyclohexyl; aryl, such as phenyl and naphthyl; alkaryl, such as tolyl and xylyl; and aralkyl, such as benzyl and phenethyl.

Examples of the groups represented by $R^4$ having the formula —$CH_2$—$CHR^2R^3$, wherein $R^2$ is $C_2$ to $C_{10}$ hydrocarbyl free of aliphatic unsaturation and $R^3$ is $R^1$ or H, include, but are not limited to, butyl, pentyl, hexyl, heptyl, octyl, nonyl, decyl, 2-methylbutyl, 2-methylpentyl, 2-methylhexyl, 2-methylheptyl, 2-methyloctyl, 2-methylnonyl, and 2-methyldecyl.

The epoxy groups represented by $R^5$ typically have from 2 to 10 carbon atoms. Examples of epoxy groups include, but are not limited to, groups having the following formulae:

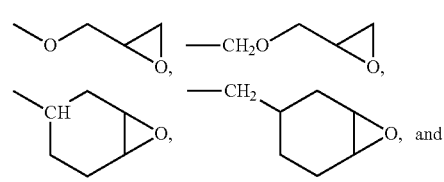

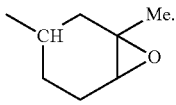

Examples of groups represented by $R^6$ having the formula $-CH_2-CHR^3R^5$, wherein $R^3$ is $R^1$ or H and $R^5$ is an epoxy group, include, but are not limited to, groups having the following formulae:

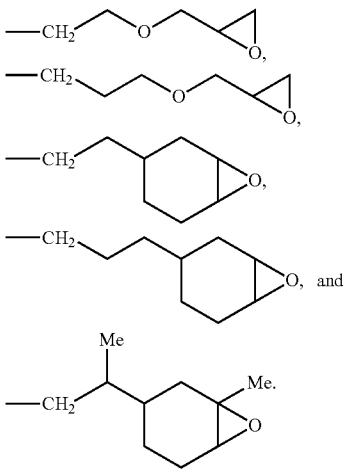

In the formula (I) of the first epoxy-functional polysiloxane, the subscripts m, n, and p outside the parenthesis denote mole fractions, which are based on the total number of moles of repeat (non-terminal) siloxane units in the polysiloxane. The subscript m typically has a value of from 0.1 to 0.9, alternatively from 0.1 to 0.8, alternatively from 0.1 to 0.5; the subscript n typically has a value of from 0.1 to 0.5, alternatively from 0.1 to 0.4, alternatively from 0.1 to 0.3; the subscript p typically has a value of from 0.1 to 0.6, alternatively from 0.1 to 0.4, alternatively from 0.1 to 0.2; and the sum m+n+p=1.

The first epoxy-function polysiloxane typically has a number-average molecular weight ($M_n$) of from 500 to 500,000, alternatively from 1,000 to 250,000, alternatively from 5,000 to 25,000, where the molecular weight is determined by gel permeation chromatography employing a refractive index detector and polystyrene standards.

Examples of the first epoxy-functional polysiloxane include, but are not limited to, polysiloxanes having the following formulae:

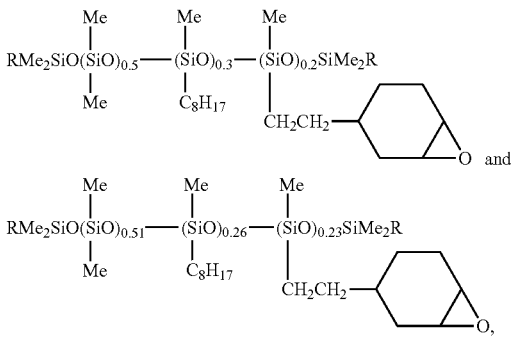

where Me is methyl, $-C_8H_{17}$ is octyl, R is $-C_8H_{17}$ or

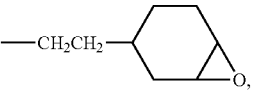

and the numerical subscripts outside the parenthesis denote mole fractions, which are based on the total number of moles of repeat (non-terminal) siloxane units in the polysiloxane. Also, in the preceding formulae, the sequence of repeat units is unspecified.

The first epoxy-functional polysiloxane can be prepared by reacting (a) an organohydrogenpolysiloxane having the formula $R^3R^1_2SiO(R^1_2SiO)_m(R^1HSiO)_n(R^1HSiO)_pSiR^1_2R^3$ with (b) an alkene having the formula $H_2C=CR^2R^3$ and (c) an epoxy-functional alkene having the formula $H_2C=CR^3R^5$ in the presence of (d) a hydrosilylation catalyst and, optionally, (e) an organic solvent, wherein $R^1$, $R^2$, $R^3$, $R^5$, m, n, p, and the sum m+n+p are as defined and exemplified above for the first epoxy-functional polysiloxane.

Organohydrogenpolysiloxane (a) has the formula $R^3R^1_2SiO(R^1_2SiO)_m(R^1HSiO)_n(R^1HSiO)_pSiR^1_2R^3$ wherein $R^1$, $R^3$, m, n, p, and the sum m+n+p are as defined and exemplified above for the first epoxy-functional polysiloxane.

Organohydrogenpolysiloxane (a) typically has a number-average molecular weight of from 150 to 300,000, alternatively from 1,500 to 100,000, alternatively from 3,000 to 30,000, where the molecular weight is determined by gel permeation chromatography employing a refractive index detector and polystyrene standards.

Examples of organohydrogenpolysiloxanes suitable for use as organohydrogenpolysiloxane (a) include, but are not limited to, trimethylsiloxy-terminated poly[dimethylsiloxane-co-(methylhydrogensiloxane)], hydrogendimethylsiloxy-terminated poly[dimethylsiloxane-co-(methylhydrogensiloxane)], triethylsiloxy-terminated poly[dimethylsiloxane-co-(methylhydrogensiloxane)], hydrogendiethylsiloxy-terminated poly[dimethylsiloxane-co-(methylhydrogensiloxane)], trimethylsiloxy-terminated poly[diethylsiloxane-co-(ethylhydrogensiloxane)], hydrogendimethylsiloxy-terminated poly[diethylsiloxane-co-(ethylhydrogensiloxane)], triethylsiloxy-terminated poly[diethylsiloxane-co-(ethylhydrogensiloxane)], hydrogendiethylsiloxy-terminated poly[diethylsiloxane-co-(ethylhydrogensiloxane)], trimethylsiloxy-terminated poly[dimethylsiloxane-co-(phenylhydrogensiloxane)], hydrogendimethylsiloxy-terminated poly[dimethylsiloxane-co-(phenylhydrogensiloxane)], triethylsiloxy-terminated poly[dimethylsiloxane-co-(phenylhydrogensiloxane)], and hydrogendiethylsiloxy-terminated poly[dimethylsiloxane-co-(phenylhydrogensiloxane)].

Methods of preparing linear organohydrogenpolysiloxanes, such as hydrolysis and condensation of organohalosilanes or equilibration of cyclosiloxanes, are well known in the art.

Alkene (b) is at least one alkene having the formula $H_2C=CR^2R^3$, wherein $R^2$ and $R^3$ are as defined and exemplified above for the first epoxy-functional polysiloxane.

Examples of alkenes suitable for use as alkene (b) include, but are not limited to, but-1-ene, pent-1-ene, hex-1-ene, hept-1-ene, oct-1-ene, non-1-ene, dec-1-ene, 2-methylbut-1-ene, 2-methylpent-1-ene, 2-methylhex-1-ene, 2-methylhept-1-ene, 2-methyloct-1-ene, 2-methylnon-1-ene, and 2-methyldec-1-ene.

Alkene (b) can be a single alkene or a mixture comprising two or more different alkenes, each having the formula $H_2C=CR^2R^3$, wherein $R^2$ and $R^3$ are as defined and exemplified above for the first epoxy-functional polysiloxane. Methods of preparing terminal alkenes are well known in the art; many of these compounds are commercially available.

Epoxy-functional alkene (c) is at least one alkene having the formula $H_2C=CR^3R^5$, wherein $R^3$ and $R^5$ are as defined and exemplified above for the first epoxy-functional polysiloxane.

Examples of alkenes suitable for use as epoxy-functional alkene (c) include, but are not limited to, alkenes having the following formulae:

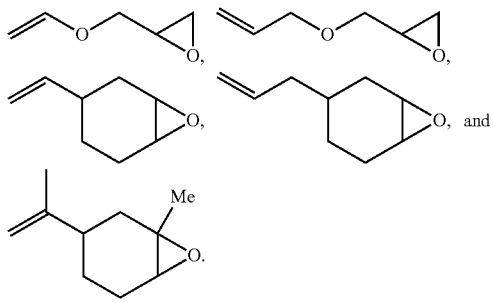

Epoxy-functional alkene (c) can be a single alkene or a mixture comprising two or more different alkenes, each having the formula $H_2C=CR^3R^5$, where $R^3$ and $R^5$ are as defined and exemplified above for the first epoxy-functional polysiloxane. Also, methods of preparing epoxy-functional alkenes are well known in the art.

Hydrosilylation catalyst (d) can be any of the well-known hydrosilylation catalysts comprising a platinum group metal (i.e., platinum, rhodium, ruthenium, palladium, osmium and iridium) or a compound containing a platinum group metal. Preferably, the platinum group metal is platinum, based on its high activity in hydrosilylation reactions.

Hydrosilylation catalysts include the complexes of chloroplatinic acid and certain vinyl-containing organosiloxanes disclosed by Willing in U.S. Pat. No. 3,419,593, which is hereby incorporated by reference. A catalyst of this type is the reaction product of chloroplatinic acid and 1,3-diethenyl-1, 1,3,3-tetramethyldisiloxane.

The hydrosilylation catalyst can also be a supported hydrosilylation catalyst comprising a solid support having a platinum group metal on the surface thereof. A supported catalyst can be conveniently separated from the organohydrogenpolysiloxane resin product, for example, by filtering the reaction mixture. Examples of supported catalysts include, but are not limited to, platinum on carbon, palladium on carbon, ruthenium on carbon, rhodium on carbon, platinum on silica, palladium on silica, platinum on alumina, palladium on alumina, and ruthenium on alumina.

Organic solvent (e) is at least one organic solvent. The organic solvent can be any aprotic or dipolar aprotic organic solvent that does not react with organohydrogenpolysiloxane (a), alkene (b), epoxy-functional alkene (c), or the epoxy-functional polysiloxane product under the conditions of the present method, and is miscible with components (a), (b), (c) and the epoxy-functional polysiloxane.

Examples of organic solvents include, but are not limited to, saturated aliphatic hydrocarbons such as n-pentane, hexane, n-heptane, isooctane and dodecane; cycloaliphatic hydrocarbons such as cyclopentane and cyclohexane; aromatic hydrocarbons such as benzene, toluene, xylene and mesitylene; cyclic ethers such as tetrahydrofuran (THF) and dioxane; ketones such as methyl isobutyl ketone (MIBK); halogenated alkanes such as trichloroethane; and halogenated aromatic hydrocarbons such as bromobenzene and chlorobenzene. Organic solvent (e) can be a single organic solvent or a mixture comprising two or more different organic solvents, each as described above.

The reaction can be carried out in any standard reactor suitable for hydrosilylation reactions. Suitable reactors include glass and Teflon-lined glass reactors. Preferably, the reactor is equipped with a means of agitation, such as stirring. Also, preferably, the reaction is carried out in an inert atmosphere, such as nitrogen or argon, in the absence of moisture.

The organohydrogenpolysiloxane (a), alkene (b), epoxy-functional alkene (c), hydrosilylation catalyst (d), and organic solvent (e) can be combined in any order. Typically, alkene (b) and epoxy-functional alkene (c) are added, either simultaneously or sequentially in any order, to organohydrogenpolysiloxane (a), and, optionally organic solvent (e) before the introduction of hydrosilylation catalyst (d).

The reaction is typically carried out at a temperature of from room temperature (~23° C.) to 110° C., alternatively from 60 to 90° C. When the temperature is less than room temperature, the rate of reaction is typically very slow.

The reaction time depends on several factors, such as the structures of the organohydrogenpolysiloxane (a), alkene (b), and epoxy-functional alkene (c), and the temperature. For example, the time of reaction is typically from 1 to 10 h at a temperature of from room temperature to 100° C. The optimum reaction time can be determined by routine experimentation using the methods set forth in the Examples section below.

The mole ratio of alkene (b) to silicon-bonded hydrogen atoms in organohydrogenpolysiloxane (a) is typically from 0.1 to 0.9, alternatively from 0.4 to 0.8. The mole ratio of epoxy-functional alkene (c) to silicon-bonded hydrogen atoms in organohydrogenpolysiloxane (a) is typically from 0.1 to 0.9, alternatively from 0.2 to 0.6. Also, the ratio of the sum of the number of moles of alkene (b) and epoxy-functional alkene (c) to the number of moles of silicon-bonded hydrogen atoms in organohydrogenpolysiloxane (a) is typically from 1 to 2, alternatively from 1 to 1.5, alternatively from 1 to 1.2.

The concentration of hydrosilylation catalyst (d) is sufficient to catalyze the addition reaction of organohydrogenpolysiloxane (a) with alkene (b) and epoxy-functional alkene (c). Typically, the concentration of hydrosilylation catalyst (d) is sufficient to provide from 0.1 to 1000 ppm of a platinum group metal, alternatively from 1 to 500 ppm of a platinum group metal, alternatively from 5 to 150 ppm of a platinum group metal, based on the combined weight of organohydrogenpolysiloxane (a), alkene (b), and epoxy-functional alkene (c). The rate of reaction is very slow below 0.1 ppm of platinum group metal. The use of more than 1000 ppm of platinum group metal results in no appreciable increase in reaction rate, and is therefore uneconomical.

The concentration of organic solvent (e) is typically from 0 to 50% (w/w), alternatively from 10 to 30% (w/w), based on the total weight of the reaction mixture.

The first epoxy-functional polysiloxane can be used without isolation or purification in the silicone composition, described below, or the polysiloxane can be separated from most of the solvent by conventional methods of evaporation. For example, the reaction mixture can be heated under reduced pressure. Moreover, when the hydrosilylation catalyst used to prepare the epoxy-functional polysiloxane is a supported catalyst, described above, the polysiloxane can be readily separated from the hydrosilylation catalyst by filtering the reaction mixture.

A second epoxy-functional polysiloxane according to the present invention has the formula:

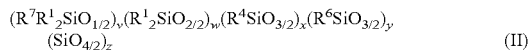
(II)

wherein $R^1$ is $C_1$ to $C_3$ alkyl or phenyl; $R^4$ is —$CH_2$—$CHR^2R^3$, wherein $R^2$ is $C_2$ to $C_{10}$ hydrocarbyl free of aliphatic unsaturation and $R^3$ is $R^1$ or H; $R^6$ is —$CH_2$—$CHR^3R^5$, wherein $R^5$ is an epoxy group; $R^7$ is $R^1$, $R^4$, or $R^6$; v is from 0 to 0.5; w is from 0.1 to 0.9; x is from 0.1 to 0.7; y is from 0.1 to 0.5; z is from 0 to 0.5; and v+w+x+y+z=1.

In the formula (II) for the second epoxy-functional polysiloxane, $R^1$, $R^2$, $R^3$, $R^4$, $R^5$, $R^6$, and $R^7$ are as defined and exemplified above for the first epoxy-functional polysiloxane. Also, the subscripts v, w, x, y, and z outside the parenthesis denote mole fractions, which are based on the total number of moles of siloxane units in the polysiloxane. The subscript v typically has a value of from 0 to 0.5, alternatively from 0.1 to 0.3, alternatively from 0.2 to 0.3; the subscript w typically has a value of from 0.1 to 0.9, alternatively from 0.2 to 0.5, alternatively from 0.2 to 0.3; the subscript x typically has a value of from 0.1 to 0.7, alternatively from 0.1 to 0.5, alternatively from 0.2 to 0.4; the subscript y typically has a value of from 0.1 to 0.5, alternatively from 0.1 to 0.4, alternatively from 0.2 to 0.3; the subscript z typically has a value of from 0 to 0.5, alternatively from 0.1 to 0.3, alternatively from 0.2 to 0.3; and the sum v+w+x+y+z=1.

The second epoxy-functional polysiloxane typically has a number-average molecular weight ($M_n$) of from 200 to 50,000, alternatively from 1,000 to 25,000, alternatively 5,000 to 10,000, where the molecular weight is determined by gel permeation chromatography employing a refractive index detector and polystyrene standards.

The second epoxy-functional polysiloxane contains $R^4SiO_{3/2}$ units (i.e., T units), $R^6SiO_{3/2}$ units (i.e. T units), and $R^1{}_2SiO_{2/2}$ units (i.e., D units), where $R^1$ and $R^4$ are as described and exemplified above. In addition to these units, the polysiloxane can also contain $SiO_{4/2}$ units (i.e., Q units) and/or $R^7R^1{}_2SiO_{1/2}$ units (i.e., M units), where $R^1$ and $R^7$ are as described and exemplified above. For example, the silicone resin can be a TD resin, a TDM resin, a TDQ resin, or a TDMQ resin.

Examples of the second epoxy-functional polysiloxane include, but are not limited to, polysiloxanes having the following formulae:

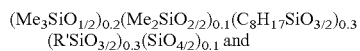

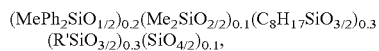

where Me is methyl, Ph is phenyl, $C_8H_{17}$ is octyl, R' is

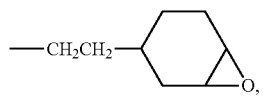

and the numerical subscripts outside the parenthesis denote mole fractions, which are based on the total number of moles of siloxane units in the polysiloxane. Also, in the preceding formulae, the sequence of units is unspecified.

The second epoxy-functional polysiloxane can be prepared by reacting (a') an organohydrogenpolysiloxane having the formula $(R^3R^1{}_2SiO_{1/2})_v(R^1{}_2SiO_{2/2})_w(HSiO_{3/2})_x(HSiO_{3/2})_y(SiO_{4/2})_z$ with (b) an alkene having the formula $H_2C=CR^2R^3$ and (c) an epoxy-functional alkene having the formula $H_2C=CR^3R^5$ in the presence of (d) a hydrosilylation catalyst and, optionally, (e) an organic solvent, wherein $R^1$, $R^2$, $R^3$, $R^5$, v, w, x, y, z, and the sum v+w+x+y+z are as defined and exemplified above for the second epoxy-functional polysiloxane.

Organohydrogenpolysiloxane (a') has the formula $(R^3R^1{}_2SiO_{1/2})_v(R^1{}_2SiO_{2/2})_w(HSiO_{3/2})_x(HSiO_{3/2})_y(SiO_{4/2})_z$, wherein $R^1$, $R^3$, v, w, x, y, z, and the sum v+w+x+y+z are as defined and exemplified above for the second epoxy-functional polysiloxane.

The organohydrogenpolysiloxane (a') typically has a number-average molecular weight of from 100 to 25,000, alternatively from 500 to 10,000, alternatively from 1,000 to 5,000, where the molecular weight is determined by gel permeation chromatography employing a refractive index detector and polystyrene standards.

Examples of organohydrogenpolysiloxanes suitable for use as organohydrogenpolysiloxane (a') include, but are not limited to, polysiloxanes having the following formulae: $(Me_3SiO_{1/2})_{0.25}(Me_2SiO_{2/2})_{0.1}(HSiO_{3/2})_{0.5}(SiO_{4/2})_{0.15}$ and $(Me_2PhSiO_{1/2})_{0.25}(MePhSiO_{2/2})_{0.25}(HSiO_{3/2})_{0.5}$, where Me is methyl, Ph is phenyl, and the numerical subscripts outside the parenthesis denote mole fractions, which are based on the total number of moles of siloxane units in the polysiloxane. Also, in the preceding formulae, the sequence of units is unspecified.

Methods of preparing organohydrogenpolysiloxane resins are well known in the art. For example, the organohydrogenpolysiloxane (a') can be prepared by cohydrolyzing a mixture of chlorosilanes having the formulae $R^3R^1{}_2SiCl$, $R^1{}_2SiCl_2$, $HSiCl_3$, and $SiCl_4$, in an organic solvent, such as toluene, where $R^1$ and $R^3$ are as defined and exemplified above. The aqueous hydrochloric acid and silicone hydrolyzate are separated and the hydrolyzate is washed with water to remove residual acid and heated in the presence of a mild condensation catalyst to "body" the resin to the requisite viscosity. If desired, the resin can be further treated with a condensation catalyst in an organic solvent to reduce the content of silicon-bonded hydroxy groups. Alternatively, silanes containing hydrolysable groups other than chloro, for example, —Br, —$OR^8$, —$OCH_2CH_2OR^8$, $CH_3C(=O)O$—, $Et(Me)C=N$—O—, $CH_3C(=O)N(CH_3)$—, and —$ONH_2$, wherein $R^8$ is $C_1$ to $C_8$ hydrocarbyl or $C_1$ to $C_8$ halogen-substituted hydrocarbyl, can be utilized as starting materials in the cohydrolysis reaction. The properties of the resin products depend on the types of silanes, the mole ratio of silanes, the degree of condensation, and the processing conditions.

The hydrocarbyl and halogen-substituted hydrocarbyl groups represented by $R^8$ typically have from 1 to 8 carbon atoms, alternatively from 3 to 6 carbon atoms. Acyclic hydrocarbyl and halogen-substituted hydrocarbyl groups containing at least 3 carbon atoms can have a branched or unbranched structure. Examples of hydrocarbyl groups represented by $R^8$ include, but are not limited to, unbranched and branched alkyl, such as methyl, ethyl, propyl, 1-methylethyl, butyl, 1-methylpropyl, 2-methylpropyl, 1,1-dimethylethyl, pentyl, 1-methylbutyl, 1-ethylpropyl, 2-methylbutyl, 3-methylbutyl, 1,2-dimethylpropyl, 2,2-dimethylpropyl, hexyl, heptyl, and octyl; cycloalkyl, such as cyclopentyl, cyclohexyl, and methylcyclohexyl; phenyl; alkaryl, such as tolyl and xylyl; aralkyl, such as benzyl and phenethyl; alkenyl, such as vinyl, allyl, and propenyl; arylalkenyl, such as styryl; and alkynyl, such as ethynyl and propynyl. Examples of halogen-substituted hydrocarbyl groups represented by $R^8$ include, but are not limited to, 3,3,3-trifluoropropyl, 3-chloropropyl, chlorophenyl, and dichlorophenyl.

Alkene (b), epoxy-functional alkene (c), hydrosilylation catalyst (d), and organic solvent (e) are as described and exemplified above in the method of preparing the first epoxy-functional polysiloxane.

The reaction for preparing the second epoxy-functional polysiloxane can be carried out in the manner described above for preparing the first epoxy-functional polysiloxane, wherein the mole ratio of alkene (b) to silicon-bonded hydrogen atoms in organohydrogenpolysiloxane (a') is typically from 0.1 to 0.9, alternatively from 0.4 to 0.8; and the mole ratio of epoxy-functional alkene (c) to silicon-bonded hydrogen atoms in organohydrogenpolysiloxane (a') is typically from 0.1 to 0.9, alternatively from 0.2 to 0.6. Also, the ratio of the sum of the number of moles of alkene (b) and epoxy-functional alkene (c) to silicon-bonded hydrogen atoms in organohydrogenpolysiloxane (a') is typically from 1 to 2, alternatively from 1 to 1.5, alternatively from 1 to 1.2.

Furthermore, the second epoxy-functional polysiloxane can be recovered from the reaction mixture as described above for the first epoxy-functional polysiloxane.

A silicone composition according to the present invention comprises:

(A) a polysiloxane selected from (i) at least one epoxy-functional polysiloxane having the formula $R^7R^1{}_2SiO(R^1{}_2SiO)_m(R^1R^4SiO)_n(R^1R^6SiO)_pSiR^1{}_2R^7$ (I), (ii) at least one epoxy-functional polysiloxane having the formula $(R^7R^1{}_2SiO_{1/2})_v(R^1{}_2SiO_{2/2})_w(R^4SiO_{3/2})_x(R^6SiO_{3/2})_y(SiO_{4/2})_z$ (II), and (iii) a mixture comprising (i) and (ii), wherein $R^1$ is $C_1$ to $C_3$ alkyl or phenyl, $R^4$ is —$CH_2$—$CHR^2R^3$, wherein $R^2$ is $C_2$ to $C_{10}$ hydrocarbyl free of aliphatic unsaturation and $R^3$ is $R^1$ or H, $R^6$ is —$CH_2$—$CHR^3R^5$, wherein $R^5$ is an epoxy group, $R^7$ is $R^1$, $R^4$, or $R^6$, m is from 0.1 to 0.9, n is from 0.1 to 0.5, p is from 0.1 to 0.6, m+n+p=1, v is from 0 to 0.5, w is from 0.1 to 0.9, x is from 0.1 to 0.7, y is from 0.1 to 0.5, z is from 0 to 0.5, and v+w+x+y+z=1; and (B) a cationic photoinitiator.

Components (A)(i) and (A)(ii) are the first epoxy-functional polysiloxane and the second epoxy-functional polysiloxane, respectively, described and exemplified above.

Component (B) is at least one cationic photoinitiator. Examples of cationic photoinitiators include, but are not limited to, onium salts, diaryliodonium salts of sulfonic acids, triarylsulfonium salts of sulfonic acids, diaryliodonium salts of boronic acids, and triarylsulfonium salts of boronic acids.

Suitable onium salts include salts having a formula selected from $R^9{}_2I^+MX_z{}^-$, $R^9{}_3S^+MX_z{}^-$, $R^9{}_3Se^+MX_z{}^-$, $R^9{}_4P^+MX_z{}^-$, and $R^9{}_4N^+MX_z{}^-$, wherein each $R^9$ is independently hydrocarbyl or substituted hydrocarbyl having from 1 to 30 carbon atoms; M is an element selected from transition metals, rare earth metals, lanthanide metals, metalloids, phosphorus, and sulfur; X is a halo (e.g., chloro, bromo, iodo), and z has a value such that the product z (charge on X+oxidation number of M)=−1. Examples of substituents on the hydrocarbyl group include, but are not limited to, $C_1$ to $C_8$ alkoxy, $C_1$ to $C_{16}$ alkyl, nitro, chloro, bromo, cyano, carboxyl, mercapto, and heterocyclic aromatic groups, such as pyridyl, thiophenyl, and pyranyl. Examples of metals represented by M include, but are not limited to, transition metals, such as Fe, Ti, Zr, Sc, V, Cr, and Mn; lanthanide metals, such as Pr, and Nd; other metals, such as Cs, Sb, Sn, Bi, Al, Ga, and In; metalloids, such as B, and As; and P. The formula $MX_z{}^-$ represents a non-basic, non-nucleophilic anion. Examples of anions having the formula $MX_z{}^-$ include, but are not limited to, $BF_4{}^-$, $PF_6{}^-$, $AsF_6{}^-$, $SbF_6{}^=$, $SbCl_6{}^-$, and $SnCl_6{}^-$.

Examples of onium salts include, but are not limited to, bis-diaryliodonium salts, such as bis(dodecyl phenyl)iodonium hexafluoroarsenate, bis(dodecylphenyl)iodonium hexafluoroantimonate, and dialkylphenyliodonium hexafluoroantimonate.

Examples of diaryliodonium salts of sulfonic acids include, but are not limited to, diaryliodonium salts of perfluoroalkylsulfonic acids, such as diaryliodonium salts of perfluorobutanesulfonic acid, diaryliodonium salts of perfluoroethanesulfonic acid, diaryliodonium salts of perfluorooctanesulfonic acid, and diaryliodonium salts of trifluoromethanesulfonic acid; and diaryliodonium salts of aryl sulfonic acids, such as diaryliodonium salts of para-toluenesulfonic acid, diaryliodonium salts of dodecylbenzenesulfonic acid, diaryliodonium salts of benzenesulfonic acid, and diaryliodonium salts of 3-nitrobenzenesulfonic acid.

Examples of triarylsulfonium salts of sulfonic acids include, but are not limited to, triarylsulfonium salts of perfluoroalkylsulfonic acids, such as triarylsulfonium salts of perfluorobutanesulfonic acid, triarylsulfonium salts of perfluoroethanesulfonic acid, triarylsulfonium salts of perfluorooctanesulfonic acid, and triarylsulfonium salts of trifluoromethanesulfonic acid; and triarylsulfonium salts of aryl sulfonic acids, such as triarylsulfonium salts of para-toluenesulfonic acid, triarylsulfonium salts of dodecylbenzenesulfonic acid, triarylsulfonium salts of benzenesulfonic acid, and triarylsulfonium salts of 3-nitrobenzenesulfonic acid.

Examples of diaryliodonium salts of boronic acids include, but are not limited to, diaryliodonium salts of perhaloarylboronic acids. Examples of triarylsulfonium salts of boronic acids include, but are not limited to, triarylsulfonium salts of perhaloarylboronic acid. Diaryliodonium salts of boronic acids and triarylsulfonium salts of boronic acids are well known in the art, as exemplified in European Patent Application No. EP 0562922.

Component (B) can be a single cationic photoinitiator or a mixture comprising two or more different cationic photoinitiators, each as defined above. The concentration of component (B) is typically from 0.01 to 5% (w/w), alternatively from 0.1 to 2% (w/w), based on the total weight of the silicone composition.

The silicone composition of can contain additional ingredients, provided the ingredient does not adversely affect the physical properties, particularly modulus, tensile strength, and adhesion, of the cured product. Examples of additional ingredients include, but are not limited to, light stabilizers; sensitizers; antioxidants; fillers, such as reinforcing fillers, extending fillers, and conductive fillers; adhesion promoters; and fluorescent dyes.

The silicone composition can be a one-part composition comprising components (A) and (B) in a single part or, alternatively, a multi-part composition comprising components (A) and (B) in two or more parts.

The silicone composition of the instant invention can be prepared by combining components (A), (B), and any optional ingredients in the stated proportions at ambient temperature. Mixing can be accomplished by any of the techniques known in the art such as milling, blending, and stirring, either in a batch or continuous process. The particular device is determined by the viscosity of the components and the viscosity of the silicone composition.

A cured polysiloxane according to the present invention can be prepared by exposing the silicone composition, described above, to ultraviolet radiation. The ultraviolet radiation typically has a wavelength of from 200 to 800 nm, alternatively from 200 to 600 nm, alternatively from 250 to 400 nm. Moreover, the dose of radiation is typically from 50 to 1,000 mJ/cm², alternatively from 50 to 500 mJ/cm². The ultraviolet radiation can be produced using a medium pressure mercury-arc lamp.

A coated optical fiber according to the present invention comprises:

an optical fiber comprising a glass fiber core and a cladding surrounding the core, wherein the cladding has a refractive index less than the refractive index of the core; and a silicone coating surrounding the optical fiber, wherein the coating comprises a cured polysiloxane prepared by applying the silicone composition of the present invention on the optical fiber to form a film and exposing the film to ultraviolet radiation.

The optical fiber of the coated optical fiber comprises a glass fiber core and a cladding surrounding the core, wherein the cladding has a refractive index less than the refractive index of the core. Both the core and the cladding are typically made of silica glass, but the core typically has germanium doping to increase its refractive index and, thus, minimize loss of light from the core. The core typically has a refractive index of at least 1.46 at 20° C. for light having a wavelength of 589 nm. The difference in refractive index between the glass fiber core and the cladding, which depends on the type and level of dopant in the core, is typically at least 0.2.

The optical fiber can be multimode optical fiber or single-mode optical fiber. Multimode fiber typically has a larger core and therefore supports multiple light wave paths. Multimode fiber typically has a core diameter of 50 μm or 62.5 μm, and a cladding thickness of 125 μm. Additionally, multimode fiber usually has a length less than 2 km. Single-mode fiber has a smaller core than multimode fiber, for example, 7.1 μm or 8.3 μm versus 50 μm or 62.5 μm. Also, single mode optical fiber typically fiber has a cladding thickness of 125 μm and a length greater than 2 km.

Methods of fabricating optical fibers, such as making a preform glass cylinder and drawing the preform into an optical fiber having the desired size, are well known in the art. Optical fibers having various dimensions, dopants, and levels of dopants are commercially available.

The silicone coating surrounding the optical fiber comprises a cured polysiloxane prepared by applying the silicone composition of the present invention on the optical fiber to form a film and exposing the film to ultraviolet radiation. The silicone coating is prepared as described below in the method of preparing the coated optical fiber. The silicone coating typically has a thickness of from 50 to 150 μm, alternatively from 60 to 100 μm.

The coated optical fiber can further comprise at least one Bragg grating. The Bragg grating is a segment of the fiber core having periodic changes in refractive index. The Bragg grating typically has a length of from 0.5 to 5 cm, alternatively from 1 to 3 cm.

A method of preparing a coated optical fiber according to the present invention comprises applying the silicone composition of the instant invention on an optical fiber to form a film, wherein the optical fiber comprises a glass fiber core and a cladding surrounding the core and the cladding has a refractive index less than the refractive index of the core; and exposing the film to ultraviolet radiation to form a silicone coating.

In the first step of the present method, a silicone composition is applied on an optical fiber to form a film. Both the silicone composition and the optical fiber are as described and exemplified above. The silicone composition can be applied on the optical fiber using conventional coating techniques, such as brushing, spraying, and dipping. Optical fibers are typically coated after being drawn from a glass preform in a continuous process. The application conditions, for example, time and temperature can be adjusted to produce a film that gives a silicone coating in the second step of the method having the desired thickness.

In the second step of the method, the film on the optical fiber is exposed to ultraviolet radiation to produce a silicone coating. The silicone coating is as described above. The ultraviolet radiation typically has a wavelength of from 200 to 800 nm, alternatively from 200 to 600 nm, alternatively from 250 to 400 nm. Also, the dose of radiation is typically from 50 to 1,000 mJ/cm², alternatively from 50 to 500 mJ/cm². The ultraviolet radiation can be produced using a medium pressure mercury-arc lamp.

The method can further comprise writing at least one Bragg grating in the glass fiber core. The grating can be written by exposing a region of the coated optical fiber to a periodic pattern of ultraviolet laser light, created by using an interferometer or phase mask, to produce periodic changes in refractive index along the fiber core in the exposed region. The ultraviolet laser light typically has a wavelength of from 157 to 350 nm, alternatively from 180 to 300 nm, alternatively from 200 to 250 nm. In particular a wavelength of 248 nm is useful for writing Bragg gratings in the in the glass fiber core. The particular wavelength of ultraviolet laser light in the aforementioned range is typically chosen such that the silicone coating is transparent to the light at that wavelength. As used herein, the term "transparent" means the silicone coating typically has a percent transmittance of at least 70%, alternatively at least 80%, alternatively at least 85%, at the selected wavelength.

The UV light can be produced using a laser, such as an excimer laser, a frequency doubled argon laser, a frequency doubled dye laser, a frequency quadrupled high power laser, a nitrogen laser, an argon ion laser, a krypton ion laser, or a copper vapor laser.

The epoxy-functional polysiloxanes of the present invention have very low absorbance in the ultraviolet region of the electromagnetic spectrum and good shelf-stability. Moreover, the polysiloxanes contain highly reactive epoxy groups and can be cured rapidly to produce durable cross-linked polysiloxanes.

The silicone composition of the present invention can be conveniently formulated as a one-part composition having good shelf-stability in the absence of ultraviolet light. Moreover, the composition can be applied to a substrate by conventional high-speed methods such as spin coating, in-line optical fiber coating, printing, and spraying. Furthermore, the silicone composition cures rapidly upon exposure to ultraviolet light.

The cured polysiloxane prepared by exposing the silicone composition to ultraviolet radiation exhibits high transparency, typically at least 70% transmittance, alternatively at least 80% transmittance, alternatively at least 85%, at a wavelength of 248 nm for a free-standing film (i.e., without a substrate) having a thickness of 60 μm. Moreover, the cured polysiloxane has good primerless adhesion to a variety of substrates. The cured polysiloxane also exhibits excellent durability, chemical resistance, and flexibility at low temperatures.

The coated optical fiber of the present invention exhibits good resistance to abrasion, organic solvents, water vapor, and oxygen. Moreover, the coated optical fiber has good thermal stability and mechanical strength.

The method of preparing the coated optical fiber of the present invention is scaleable to a high throughput manufacturing process. Also, the method employs conventional optical fiber fabrication techniques (e.g., coating and curing) and equipment. Importantly, the method can further comprise writing at least one Bragg grating on the core of the fiber directly through the silicone coating, thereby eliminating conventional stripping and recoating operations and the problems associated therewith.

The coated optical fiber of the present invention is useful in a wide variety of applications, including telecommunications, sensors, and sensor arrays. In particular, the coated optical fiber containing at least one Bragg grating is useful in telecommunication components and devices, such as narrowband and broadband tunable filters, optical fiber mode converters, spectrum analyzers, narrowband lasers, wavelength stabilizers for pump lasers, add/drop filters for wavelength division multiplexing, and gain-flattening filters; and in fiber optic sensors, particularly sensors for strain, pressure, and temperature measurements.

EXAMPLES

The following examples are presented to better illustrate the epoxy-functional polysiloxanes, silicone composition, and cured polysiloxane of the present invention, but are not to be considered as limiting the invention, which is delineated in the appended claims. Unless otherwise noted, all parts and percentages reported in the examples are by weight. The following methods and materials were employed in the examples:

Infrared Spectra

Infrared spectra of epoxy-functional polysiloxanes were recorded on a Perkin Elmer Instruments 1600 FT-IR spectrometer. A drop of a reaction mixture containing the polysiloxane was applied to a KBr window to form a thin film.

NMR Spectra

Nuclear magnetic resonance spectra ($^{29}$Si NMR) of epoxy-functional polysiloxanes in deuterated chloroform, $CDCl_3$, were obtained using a Varian Mercury 400 MHz NMR spectrometer. The chemical shift values ($\delta$) reported in the examples are in units of parts per million (ppm), measured relative to the internal standard (tetramethylsilane).

Ultraviolet Light Source

Irradiation of a silicone film was carried out using a Fusion model F450 curing system equipped with a 10-inch model BT9 electrodeless H-bulb.

Refractive Index

The refractive index of cured polysiloxane films on silicon wafers was determined using a Reichert Model 10494 Abbe Mark II Plus refractometer. The refractive index was determined at 20° C. for light having a wavelength of 589 nm.

Transmittance

The UV-Visible absorption spectra (250 to 800 nm) of cured polysiloxane films on glass substrates were determined using an Optical Solutions PS-2 portable diode array spectrophotometer system. A free-standing cured polysiloxane film was inserted into the sample chamber and scanned from 200-800 nm in the UV-visible regions. Reference and background scans were performed with an empty sample chamber in air. The percent transmittance was calculated from the absorbance at 248 nm.

Dimethylcyclosiloxanes: a fluid containing 98% (w/w) of octamethylcyclotetrasiloxane ($D_4$) and 2% (w/w) of decamethylcyclopentasiloxane ($D_5$).

Methylhydrogencyclosiloxanes: a fluid containing 98% (w/w) of 2,4,6,8-tetramethylcyclo-tetrasiloxane ($D^H_4$) and 2% (w/w) of 2,4,6,8,10-pentamethylcyclopentasiloxane ($D^H_5$).

Example 1

Dimethylcyclosiloxanes (267.3 g, ~3.61 mol of $D_4$), 216.6 g (~3.61 mol of $D^H_4$) of Methylhydrogencyclosiloxanes, and 9.97 g (0.074 mol) of 1,1,3,3-tetramethyldisiloxane were combined in a flask equipped with a condenser, agitator, and heating mantle. The mixture was treated with 5 g of Tonsil® Optimum clay catalyst. The mixture was heated to 65° C. with agitation and kept at this temperature for 2 h. The mixture was then heated to 80° C. and kept at this temperature until equilibrium was reached, as indicated by a constant ratio of cyclosiloxanes to linear polysiloxane in the $^{29}$Si NMR spectrum of the mixture. The mixture was allowed to cool to room temperature and then filtered through Grade 4 Whatman® filter paper to remove the catalyst. The filtrate was stripped (distilled) at 130° C. and 0.1 mm Hg (13.3 Pa) to remove most of the cyclosiloxanes. The residue consisted of a dimethylhydrogensiloxy-terminated poly[dimethylsiloxane-co-(methylhydrogensiloxane)] having the formula $HMe_2SiO(Me_2SiO)_{54}(HMeSiO)_{51}SiMe_2H$, as determined by $^{29}$Si NMR.

Example 2

1-Octene (43.33 g, 0.39 mol) and 47.94 g (0.39 mol) of 4-vinyl-1-cyclohexene 1,2-epoxide were combined in a flask equipped with an agitator, thermometer, and addition funnel. The mixture was heated to 70° C. and 3.83 g of platinum (0.5%) on alumina was added to the flask. The dimethylhydrogensiloxy-terminated poly[dimethylsiloxane-co-(methylhydrogensiloxane)] of Example 1 (100 g, 0.77 mol silicon-bonded hydrogen atoms) was added to the mixture at such a rate as to keep the temperature below 100° C. The progress of the reaction was monitored by periodically withdrawing an aliquot of the mixture for FT-IR analysis. When the Si—H absorption at 2100-2200 cm$^{-1}$ was no longer evident, the mixture was allowed to cool to room temperature. The mixture was filtered through a membrane (1 μm) to remove the catalyst, and the filtrate was passed through a Pope Wiped-Film Still at a temperature of 120° C. and pressure of 0.05 mm Hg (6.7 Pa) to give an epoxy-functional polysiloxane having the formula:

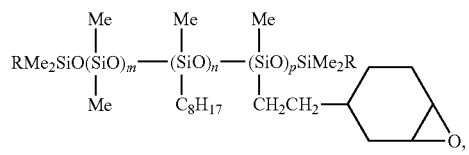

where R is —$C_8H_{17}$ or

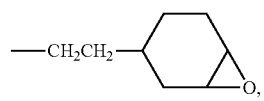

m is 54, n is 27, and p is 24, as determined by $^{29}$Si NMR. In the preceding formula the subscripts m, n, and p denote mole fractions, which are based on the total number of moles of repeat (non-terminal) siloxane units in the polysiloxane. The polysiloxane was obtained as a colorless fluid having a refractive index, $\eta^{20}D$, of 1.4537 and a viscosity of 419 cS (419 mm$^2$).

Example 3

An epoxy-functional polysiloxane having the formula:

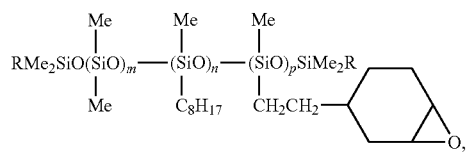

where R is —C$_8$H$_{17}$ or

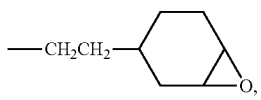

m is 54, n is 36, and p is 15, as determined by $^{29}$Si NMR, was prepared according to the method of Example 2, except 69.81 g (0.62 mol) of 1-octene and 23.41 g (0.1885 mol) of 4-vinyl-1-cyclohexene 1,2-epoxide were used in the reaction. In the preceding formula the subscripts m, n, and p denote mole fractions, which are based on the total number of moles of repeat (non-terminal) siloxane units in the polysiloxane. The polysiloxane was obtained as an colorless fluid having a refractive index, η$^{20}$D, of 1.4689 and a viscosity of 578 cS (578 mm$^2$/s).

Example 4

The epoxy-functional polysiloxane of Example 3 (25 g) was thoroughly mixed with 25 g of 1,1,3,3-tetramethyl-1,3-bis[2-(7-oxabicyclo[4.1.0]hept-3-yl)-ethyl]disiloxane [CAS No. 18724-32-8]. A portion (3 g) of the mixture was combined with 0.003 g of a solution of 10% (w/w) of (4-Isopropylphenyl)(4-methylphenyl)iodonium tetrakis(pentafluorophenyl) borate [CAS No. 47855-94-7] in dichloromethane. The resulting composition was uniformly applied to a Teflon substrate using a metering rod to form a film having a thickness of 60 μm. The film was exposed to ultraviolet radiation at a dose of 300 mJ/cm$^2$ to cure the polysiloxane. The cured polysiloxane was peeled away from the Teflon substrate to give a cured free-standing film having a transmittance of 85.4% at 248 nm, a refractive index @ 632.8 nm=1.474, and a refractive index @ 1554 nm=1.464.

Example 5

A cured polysiloxane film was prepared as described in example 4, except the composition contained 0.015 g of a 10% (w/w) solution of Iodonium-[4-(1-methylethyl)phenyl][4-methylphenyl]tetrakis(pentafluorophenyl)]borate in dichloromethane, and the dosage of ultraviolet radiation was 100 mJ/cm$^2$. The free-standing cured polysiloxane film had a transmittance of 72.3% at 248 nm.

That which is claimed is:

1. An epoxy-functional polysiloxane having the formula:

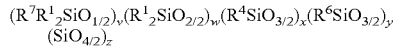

wherein R$^1$ is C$_1$ to C$_3$ alkyl or phenyl; R$^4$ is —CH$_2$—CHR$^2$R$^3$, wherein R$^2$ is C$_2$ to C$_{10}$ hydrocarbyl free of aliphatic unsaturation and R$^3$ is R$^1$ or H; R$^6$ is —CH$_2$—CHR$^3$R$^5$, wherein R$^5$ is an epoxy group; R$^7$ is R$^1$, R$^4$, or R$^6$; v is from 0 to 0.5; w is from 0.1 to 0.9; x is from 0.1 to 0.7; y is from 0.1 to 0.5; z is from 0 to 0.5; and v+w+x+y+z=1.

2. A silicone composition, comprising:
(A) a polysiloxane selected from at least one epoxy-functional polysiloxane of claim 1 and a mixture comprising the at least one epoxy-functional polysiloxane of claim 1 and (i):
(i) at least one epoxy-functional polysiloxane having the formula R$^7$R$^1_2$SiO(R$^1_2$SiO)$_m$(R$^1$R$^4$SiO)$_n$(R$^1$R$^6$SiO)$_p$SiR$^1_2$R$^7$     (I), wherein R$^1$ is C$_1$ to C$_3$ alkyl or phenyl, R$^4$ is —CH$_2$—CHR$_2$R$^3$, wherein R$^2$ is C$_2$ to C$_{10}$ hydrocarbyl free of aliphatic unsaturation and R$^3$ is R$^1$ or H, R$^6$ is —CH$_2$—CHR$^3$R$^5$, wherein R$^5$ is an epoxy group, R$^7$ is R$^1$, R$^4$, or R$^6$, m is from 0.1 to 0.9, n is from 0.1 to 0.5, p is from 0.1 to 0.6, m+n+p=1, v is from 0 to 0.5, w is from 0.1 to 0.9, x is from 0.1 to 0.7, y is from 0.1 to 0.5, z is from 0 to 0.5, and v+w+x+y+z=1; and (B) a cationic photoinitiator.

3. A cured polysiloxane prepared by exposing the silicone composition according to claim 2 to ultraviolet radiation.

4. A coated optical fiber comprising:
an optical fiber comprising a glass fiber core and a cladding surrounding the core, wherein the cladding has a refractive index less than the refractive index of the core; and
a silicone coating surrounding the optical fiber, wherein the coating comprises a cured polysiloxane prepared by applying the silicone composition of claim 2 on the optical fiber to form a film and exposing the film to ultraviolet radiation.

5. A method of preparing a coated optical fiber, the method comprising the steps of:
applying the silicone composition of claim 2 on an optical fiber to form a film, wherein the optical fiber comprises a glass fiber core and a cladding surrounding the core and the cladding has a refractive index less than the refractive index of the core; and
exposing the film to ultraviolet radiation to form a silicone coating.

6. The method according to claim 5, further comprising writing at least one Bragg grating in the glass fiber core.

* * * * *